United States Patent [19]

Welker

[11] Patent Number: 5,756,906
[45] Date of Patent: May 26, 1998

[54] STABILIZED INSERTION DEVICE

[75] Inventor: Brian H. Welker, Sugar Land, Tex.

[73] Assignee: Welker Engineering Company, Sugar Land, Tex.

[21] Appl. No.: 814,668

[22] Filed: Mar. 11, 1997

[51] Int. Cl.$^6$ .................................................. G01F 15/18
[52] U.S. Cl. ........................ 73/863.5; 73/866.5; 403/107
[58] Field of Search ...................... 73/863.81, 863.85, 73/863.86, 866.5; 403/107, 377, 381

[56] References Cited

U.S. PATENT DOCUMENTS

| | | | |
|---|---|---|---|
| 4,177,676 | 12/1979 | Welker | 73/866.5 |
| 5,639,975 | 6/1997 | Waterman | 73/866.5 |

Primary Examiner—Ronald L. Biegel
Attorney, Agent, or Firm—Herzog, Crebs & McGhee

[57] ABSTRACT

A stabilized insertion device to prevent harmonic vibration or "wiggle" when inserting a probe or sensor into a gas pipeline. A shaft guide is placed around the shaft inside the housing of the insertion device. The shaft guide is composed of two sections. The first section is wider than the second. The second section is received by a spool bushing located inside the housing proximate to the pipeline. When the shaft is fully extended the spool bushing holds the shaft guide steady which in turn holds the shaft steady. An annular bevel and taper may be added to the spool bushing and shaft guide, respectively, to aid in the coupling thereof. Optionally, the shaft guide may be bisected to make it movable to different positions on the shaft, thereby allowing for probe insertion at a variety of depths.

13 Claims, 2 Drawing Sheets

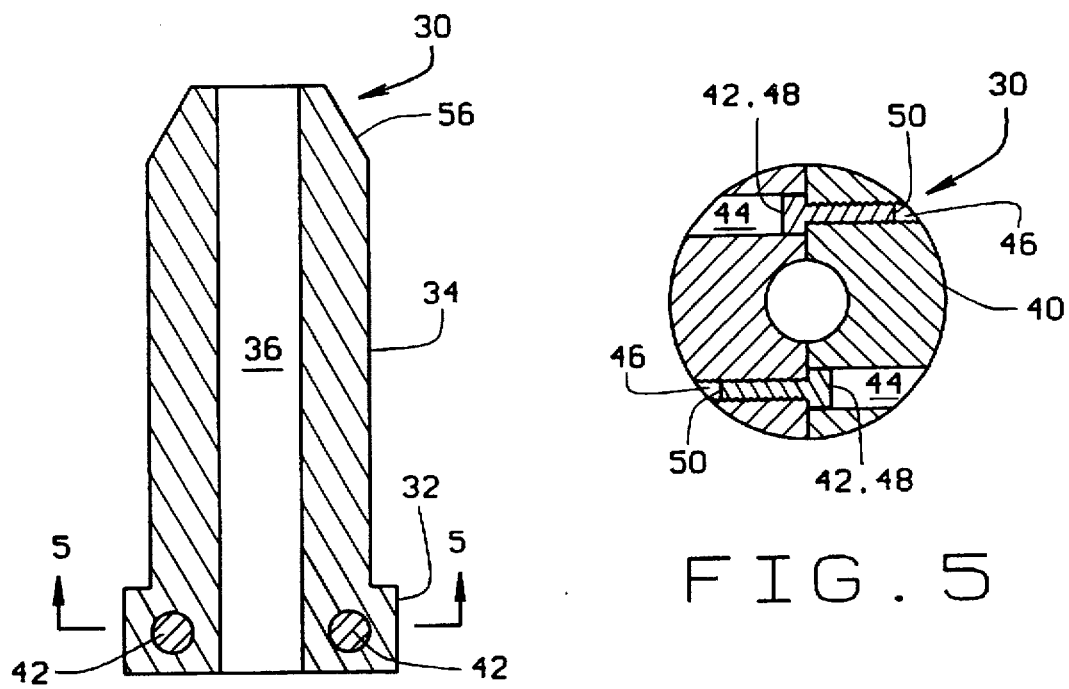
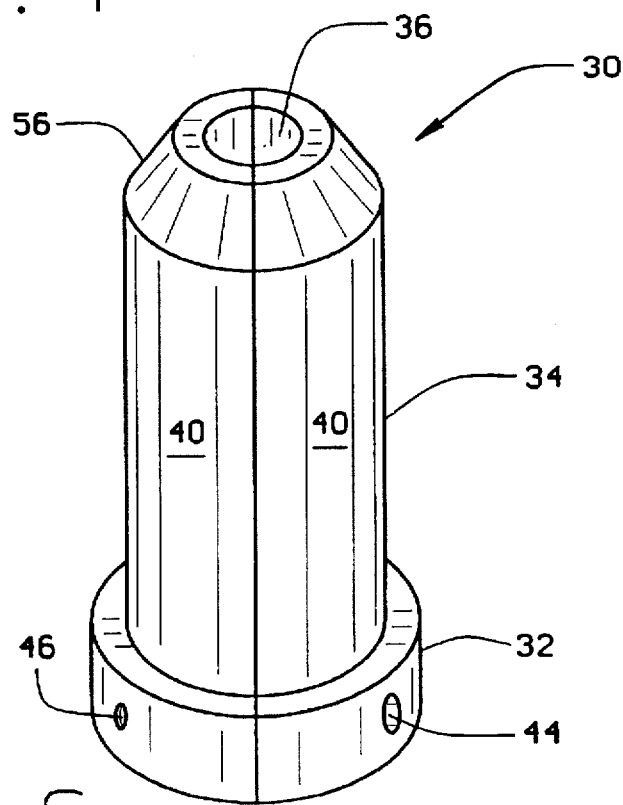

STABILIZED INSERTION DEVICE

FIELD OF THE INVENTION

The present invention relates to insertion devices for placing probes or sensors inside a pipeline, and more specifically to a stabilized insertion device which can place probes or sensors in a pipeline without harmonic vibrations.

BACKGROUND OF THE INVENTION

It is often necessary to insert various types of sensors, probes, and similar devices into the center of a pipeline carrying a fluid such as natural gas. Many insertion devices have been devised to accomplish this task. Several examples include the "Automatic Insertion Device" disclosed in U.S. Pat. No. 4,631,967, to Welker, the "Sensor Positioning Apparatus" disclosed in U.S. Pat. No. 4,177,676 to Welker, and the "Probe Insertion Apparatus" disclosed in U.S. Pat. No. 4,387,592 to Welker.

In each of these devices, the device to be inserted is attached to the head of a shaft contained in a cylindrical housing. The housing is mounted on a ball valve, which in turn is mounted on a natural gas or similar type pipeline at a tee. The shaft is then extended from the housing until the inserted device is at the desired depth within the pipeline, typically the center thereof, where the inserted device can perform its intended function.

The limitation of these and other similar insertion devices becomes apparent on models with longer insertion shafts. The flow of gas or other fluid hitting a long small diameter shaft can cause vibration, or "wiggle" in the shaft, particularly where the shaft is not held steady between the head and the lubricator. The lubricator is located deep within the housing, away from the pipeline. The vibration reduces the stability of the probe placement and shortens the life of the insertion device. If the vibration is harmonic, noticeable damage may occur in the inserted device and in the insertion device itself.

Accordingly, it is an object of this invention to provide an insertion device that can keep an inserted probe or sensor steady within the pipeline.

It is another object of this invention to proved an insertion device with long shafts that has a longer expected life than the prior art.

It is yet another object of this invention to provide an insertion device that is not subject to wiggle at longer depths. Other objects of the invention will become apparent from the specification described herein below.

SUMMARY OF THE INVENTION

In accordance with the objects listed above and others, an insertion device is provided with additional components thereto which minimize shaft vibration. An insertion shaft is disposed within a hollow cylindrical housing as with a conventional insertion device. The housing is releasably coupled to a ball joint which in turn is coupled to a tee section of a pipeline, the housing being held perpendicular to the pipeline.

At the end of the shaft near the pipeline and the ball joint, a head is added to receive a sensor, probe, or similar device to be inserted into the pipeline. A lubricator is located some distance away from the ball joint and pipeline to keep the shaft moving smoothly when being extended or retracted. Such components are known in the art.

The novel part of the invention is the addition of a shaft guide and preferably a spool bushing designed to receive the shaft guide, as well. The shaft guide is preferably mounted on the shaft at a predetermined distance from the head, such that when the shaft is fully extended to the desired depth, the section of the shaft with the attached shaft guide is received within the housing, adjacent the ball joint. It is recommended that a spool bushing be located within the housing adjacent the ball joint and be adapted to receive the shaft guide when the shaft is fully extended.

In the preferred embodiment of the present invention, the shaft guide is preferably cylindrical and is composed of two sections with a common axial bore extending all of the way through the shaft guide. The first section should have the same cross-sectional shape and area as the hollow part of the housing, normally circular. The first section may have a length approximately equal to the diameter of the shaft. It can also be somewhat longer or shorter, however.

The second section of the shaft guide is located nearer the pipeline than the first section and should have a slightly smaller diameter than the first section. A preferred embodiment also includes a spool bushing with an inside diameter equal to the outside diameter of the second section of the shaft guide. Greatest stability can be achieved when the second section of the shaft guide is equal in length to the spool bushing, both of which should be significantly longer than the length of the first section of the shaft guide.

In the preferred embodiment, when the shaft is fully extended, the second section of the shaft guide should interface with the spool bushing, which is securely placed in the pipeline end of the housing. The second section of the shaft guide should be all the way inside the spool bushing so that the end of the spool bushing remote from the pipeline will abut the first section of the shaft guide. Annular bevels may be added to the shaft guide and the spool bushing to aid the coupling therebetween.

BRIEF DESCRIPTION OF THE DRAWINGS

So that the manner in which the above-identified features, advantages, and objects of the present invention are attained and can be understood in detail, a more particular description of the invention, briefly summarized above, may be had by reference to the embodiment thereof which is illustrated in the appended drawings.

It is noted, however, that the appended drawings illustrate only a typical embodiment of this invention and is therefore not to be considered limiting of its scope, for the invention may admit to other equally effective embodiments. Reference the appended drawings, wherein:

FIG. 4 is an enlarged cross-sectional side view of the shaft guide in accordance with the present invention;

FIG. 5 is an enlarged cross-sectional view of the shaft guide in accordance with the present invention taken along line 5—5 of FIG. 4; and FIG. 6 is an enlarged perspective view of the shaft guide in accordance with the present invention.

DETAILED DESCRIPTION OF THE DRAWINGS

Figure 1:
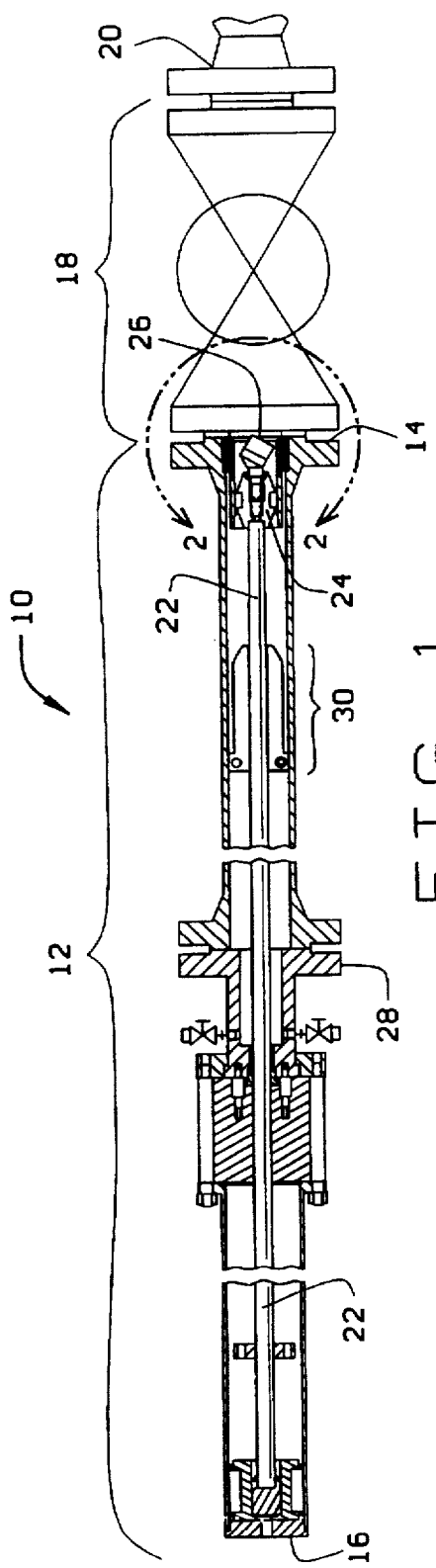
FIG. 1 is a cross-sectional view of the present stabilized insertion device.
Figure 3:
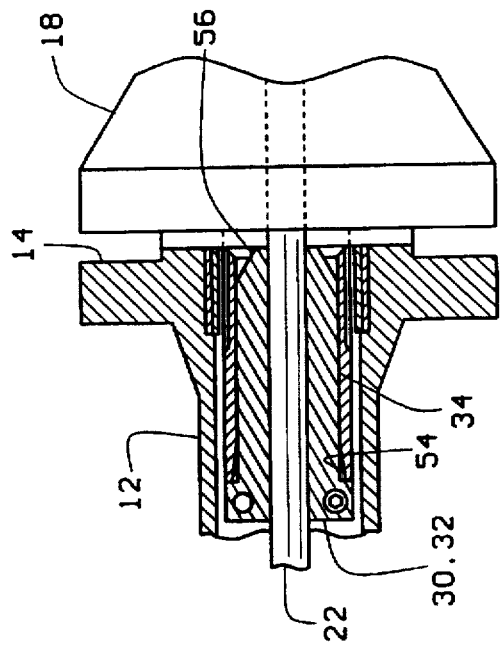
FIG. 3 is an enlarged cross-sectional view of the area shown in FIG. 2, but in a fully extended state.
Figure 2:
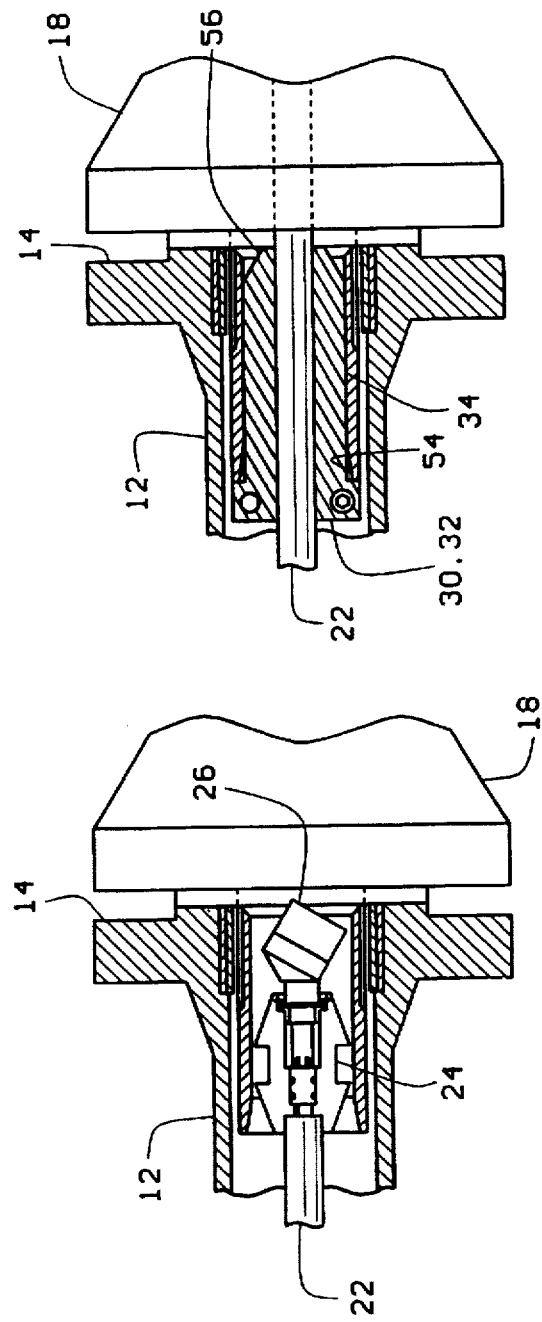
FIG. 2 is an enlarged cross-sectional view of the area about arc 2—2 of FIG. 1 showing the head of the stabilized insertion device in the retracted state.

Referring now to FIG. 1, an insertion device is shown generally, designated 10. The device 10 is composed of a hollow predominantly cylindrical housing 12 and a ball valve 18. The cylindrical housing 12 has a proximate end 14 near the ball valve 18 and a distal end 16 remote from the ball valve 18. The ball joint 18 is in turn releasably coupled to a tee 20 on a pipeline (not shown) carrying natural gas or other fluid.

Disposed within the housing 12, is a shaft 22. Disposed on the end of the shaft 22 is a head 24, upon which may be mounted a probe 26 or any of a variety of similar devices. A lubricator body 28 containing some lubricant is added to the housing 12 to aid in the smooth movement of the shaft 22. The lubricator body 28 continuously applies the lubricant to the shaft 22 as the shaft 22 passes therethrough. In the prior art, the lubricator body 28 is responsible for holding the shaft 22 steady during insertion of the probe 26.

In the present invention, a shaft guide 30 is mounted on the shaft 22 to hold the shaft 22 steady during insertion of the probe 26. The preferred embodiment of the shaft guide 30 can best be seen in FIGS. 4–6. The preferred embodiment of the shaft guide 30 is a cylinder with two sections, a first section 32 and a second section 34, and a common axial bore 36. The first section 32 should fit inside the housing 12 and be slightly smaller in outside diameter than the inside diameter of the housing 12. The axial bore 36 should fit closely around the shaft 22. The second section 34 should also be cylindrical, however smaller in diameter than the first section 32 and may be significantly longer in axial length. When mounted on the shaft 22, the shaft guide should be oriented such that the second section 34 is closer to the proximate end 14 of the housing 12. The shaft guide 30 may be made of any of a wide variety of materials, however it has been noted by the inventor that aluminum works very well.

Optionally, the shaft guide 30 may be formed from two identical pieces 40a and 40b, splitting the shaft guide 30 in half down its axis. This is done so that the shaft guide 30 can be unmounted from the shaft 22 and remounted thereupon at a different point along the shaft 22, thereby accommodating different depths of insertion. If this is done, the pieces 40a and 40b of the shaft guide 30 may be held together by screws or bolts 42. Two bores, a large bore 44 and a small bore 46 are drilled through the shaft guide 30 perpendicular to the plane dividing the two pieces 40a and 40b, but skew with the axial bore 36. The large bore 44 is sized to receive the bolt head 48 and the small bore 46 is threaded and sized to receive the bolt shaft 50. The large bore 44 and small bore 46 may be placed in the second section 34 of the shaft guide 30, however it is preferred to place them in the first section 32 (as shown) to allow for larger bolts 42 without touching the axial bore 36.

The preferred embodiment includes a spool bushing 54 is disposed within the housing 12 very near the proximate end 14. The outside diameter of the spool bushing 54 should be approximately equal to the outside diameter of the first section 32 of the shaft guide. The inside of the spool bushing 54 should be sized to receive the second section 34 of the shaft guide 30. Specifically, the spool bushing 54 should have an inside diameter slightly larger than the outside diameter of the second section 34 of the shaft guide 30 and a length approximately equal to, but at least as long as the second section 34 of the shaft guide 30. The spool bushing should be firmly coupled with the housing 12 in a fixed position. In operation, the shaft 22 is extended until the shaft guide 30 couples with the spool bushing 54, the first section 32 of the shaft guide 30 contacting the distal end of the spool bushing 54. The spool bushing 54 should be wide enough to prevent the shaft guide 30 from extending therebeyond, unless some other means are provided for preventing the shaft guide 30 from extending beyond the spool bushing 54. Keeping the shaft guide 30 from extending beyond the spool bushing 54 is useful in the preferred embodiment, however not necessary, because it the spool bushing 54 which holds the shaft guide 30 steady, which in turn holds the shaft 22 steady. The preferred material for the spool bushing 54 is carbon steel, though other materials will also work well.

If a close fit is used between the spool bushing 54 and the shaft guide 30 as is preferable, even slight vibrations in the shaft 22 during extension may hinder the reception of the shaft guide 30 by the spool bushing 54. An annular bevel 54 may be added to the distal end of the spool bushing 54 and/or a taper 56 may be added to the proximate end of the shaft guide 30. The annular bevel 54 and the taper 56 will assist the reception of the shaft guide 30 by the spool bushing 54.

It should be noted that only the shaft guide 30 is necessary to reduce vibration of the shaft 22. Use of a two-section shaft guide 30 in conjunction 54 is preferred as it will further reduce vibration of the shaft 22, but such components should not be considered limiting.

While the foregoing is directed to the preferred embodiments of the present invention, other and further embodiments of the invention may be devised without departing from the basic scope thereof, and the scope thereof is determined by the claims which follow.

What is claimed is:

1. A stabilized insertion device comprising:
 a housing having front and back ends and an inside diameter;
 a shaft having front and back ends and a diameter, said shaft disposed within said housing and blocked from exiting said back end of said housing, said front and back ends of said shaft corresponding to said front and back end; of said housing;
 a head disposed at said front end of said shaft; and
 a shaft guide mounted on said shaft, said shaft guide having an outer diameter equal to the inside diameter of said housing and an inside diameter equal to the diameter of said shaft, wherein said shaft guide consists of a primary and a secondary section, said primary section having an outer diameter equal to the inside diameter of said housing and inside diameter equal to the diameter of said shaft, and said secondary section having an outside diameter smaller than the outside diameter of said primary section and an inside diameter equal to the diameter of said shaft.

2. The stabilized insertion device of claim 1, wherein said shaft guide is oriented with said secondary section closer to the front of said housing, and further comprising a spool bushing disposed within said housing near said front end thereof, said spool bushing having an outside diameter equal to the inside diameter of said housing and an inside diameter equal to the outside diameter of said secondary section of said shaft guide.

3. The stabilized insertion device of claim 2, wherein said secondary section of said shaft guide is equal to or shorter in length than said spool bushing.

4. The stabilized insertion device of claim 2, wherein said shaft guide slopes inwardly forward from a point near the front of said shaft guide.

5. The stabilized insertion device of claim 4, wherein the spool bushing has an inside wall which slopes inwardly forward until a point near the back of said spool bushing.

6. The stabilized insertion device of claim 1, wherein said shaft guide may be unmounted from said shaft and remounted at a different location said shaft.

7. The stabilized insertion device of claim 1, further comprising a lock down collar mounted on said shaft to further limit the range of axial movement of said shaft.

8. A stabilized insertion device comprising:

a hollow cylindrical housing having a front and a back end and an inside diameter;

a shaft disposed within said housing, said having a front and a back end corresponding to said front and back ends of said housing;

an insertion head coupled to said front end of said shaft;

a shaft guide mounted on said shaft, said shaft guide preventing off-axial movement of said shaft; and a spool bushing affixed to the inside of said housing in proximity to said front end thereof, said spool bushing receiving a locking portion of said shaft guide when shaft is extended from said housing, said spool bushing preventing off-axial and forward axial movement of said shaft guide, and said locking portion located toward the front of said shaft guide.

9. The stabilized insertion device of claim 8, wherein a section of said shaft guide is cylindrical, the entire perimeter thereof contacting the inside of said housing.

10. The stabilized insertion device of claim 9, wherein said locking portion of said shaft guide is cylindrical, but smaller in diameter than the remainder of said shaft guide, the entire perimeter of said locking section contacting the inside of said spool bushing when said shaft guide is received thereby.

11. The stabilized insertion device of claim 10, further comprising an inwardly tapered portion on the front of said locking portion of said shaft guide, and an outwardly tapered portion of said spool bushing, said outwardly tapered portion of said spool bushing located near the back and on the inside thereof, said inwardly and outwardly tapered portions cooperatively assisting the reception of said shaft guide by said spool bushing.

12. The stabilized insertion device of claim 8, wherein said shaft guide may be unmounted from said shaft and remounted at a different location on said shaft.

13. The stabilized insertion device of claim 8, further comprising a lock down collar mounted on said shaft preventing extension of said shaft beyond said back end of said housing.

\* \* \* \* \*